(No Model.)

J. VOM HOFE.
FISHING REEL.

No. 343,782. Patented June 15, 1886.

WITNESSES:
John M. Deemer
C. Sedgwick

INVENTOR:
J. Vom Hofe
BY Munn & Co
ATTORNEYS.

UNITED STATES PATENT OFFICE.

JULIUS VOM HOFE, OF BROOKLYN, NEW YORK.

FISHING-REEL.

SPECIFICATION forming part of Letters Patent No. 343,782, dated June 15, 1886.

Application filed April 27, 1886. Serial No. 200,296. (No model.)

*To all whom it may concern:*

Be it known that I, JULIUS VOM HOFE, of the city of Brooklyn, in the county of Kings and State of New York, have invented a new and useful Improvement in Fishing-Reels, of which the following is a full, clear, and exact description.

This invention relates to the heads of the frame of the reel, which carry the spool of the reel and the gearing used to rotate said spool, and it is designed as an improvement upon that description of such frames in which the heads are made partly of hard rubber secured to inner metal plates or disks, dished to receive the heads of the spool, and presenting annular metal borders outside of the rubber, with projections for the usual brace-rods that unite the two heads. In such former constructions the inner metal plates or disks require to be separately dished for the heads of the spool, and they are separately attached, as by screws or rivets, to the rubber portions of the heads, after which the whole has to be burnished, to give a proper finish to the combined rubber and metal parts of the heads. Not only does such construction involve considerable labor in the fitting of the reel, especially the head which carries the gearing, but the reel has objectionable weight, and the rubber is liable to become detached from the inner plate which carries it, thus weakening the reel as a whole.

My invention obviates these defects; and it consists in constructing the reel-heads of hard rubber, with the inner metal plates of open-work finish or in the form of braces let into or embedded in the rubber before vulcanizing the latter, so as virtually to constitute integral portions of the rubber heads, and said plates afterward recessed on their inner faces in common with the rubber to receive the rotating spool-heads within them, whereby a much cheaper, lighter, and stronger reel is produced.

This improved construction is altogether distinct from and different to that described in Letters Patent No. 330,811, granted me November 17, 1885, in which a solid rubber head has combined with it an outer metal plate.

Reference is to be had to the accompanying drawings, forming a part of this specification, in which similar letters of reference indicate corresponding parts in all the figures.

Figure 1:
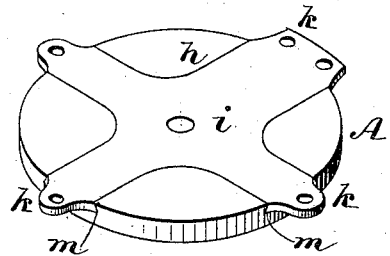
Figure 2:
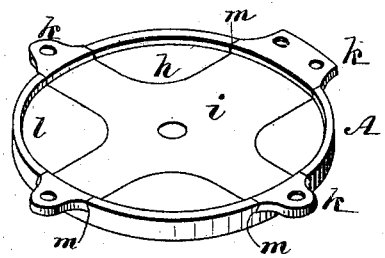
Figure 3:
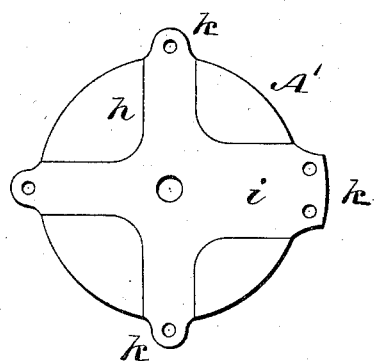
Figure 4:
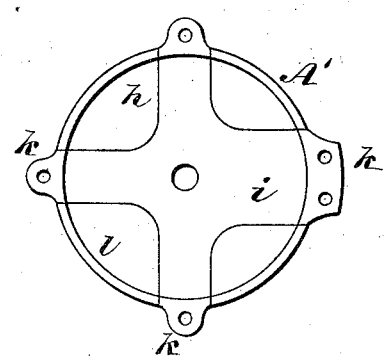
Figure 5:
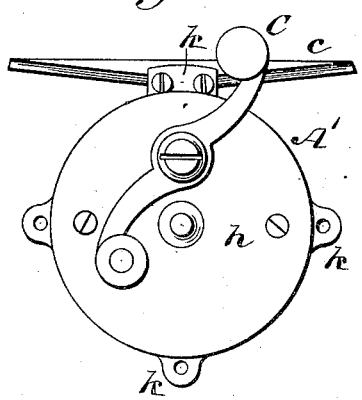
Figure 6:
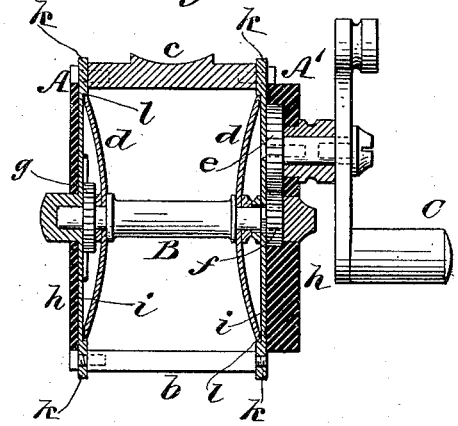

Figure 1 represents a view in perspective of one of the combined rubber and metal heads before vulcanization of the rubber with the metal brace-plate in it, and Fig. 2 a perspective view of the same after vulcanization of the rubber and after the rubber and metal brace in it have been recessed for reception of the spool-head. Figs. 3 and 4 are inner face views of the other combined rubber and metal head in like stages of construction; Fig. 5, an exterior view of the reel as seen from its handle or crank end, and Fig. 6 a longitudinal section thereof.

A A' indicate the two heads of the reel-frame, united by the usual tie-rods, $b$, and $c$ is the foot-piece or support by which the reel is carried upon the rod of the angler.

B is the spool of the reel, consisting of a rotating barrel with attached heads $d\ d$, as usual, and having its bearings in the frame-heads or in metal bushings, &c., connected therewith.

$e\ f$ is the usual gearing in the one frame-head, by which the reel-spool is rotated; and C, the handle for operating the same.

$g$ is the usual click mechanism within the other frame-head.

The frame-heads A A' present the same exterior appearance as solid rubber heads, they being composed of hard-rubber outer main heads or bodies $h$, and inner open-work or brace-plates, $i$, having outer end projections, $k$, for uniting the two heads together by the tie-rods $b$, and for carrying in between the heads the foot-piece $c$. To make these combined rubber and metal heads, the rubber bodies $h$ are molded into form and the metal brace-plates $i$ pressed into the inner faces of said bodies, so as to be flush, or thereabout, with said inner faces, as shown in Figs. 1 and 3, after which the rubber bodies, containing the brace-plates, are vulcanized, so as to make the brace-plates integral with the hard-rubber bodies, and subsequently the rubber bodies and their embedded brace-plates are turned out or recessed in common on the inner faces of the heads, to form circular depressions $l$, flush on their backs, as shown in Figs. 4 and 5, for the heads $d\ d$ of the spool to turn within.

This makes a strong, light, and durable construction of the frame-heads, as hereinbefore referred to. The frame-head A, not requiring to be removed, has the arms or partitions of its brace-plate $i$ of dovetail construction in direction of their thickness, as shown at $m\,m$ in Figs. 1 and 2, so that after vulcanization of the rubber body said embedded brace-plate will have a positive and firm dovetail lock with or hold on the rubber. The other frame-head, A', requiring to be removed, has the arms or portions of its brace-plate $i$ of straight or rectangular construction on their embedded edges, as shown in Figs. 3 and 4.

The drilling or fitting of the frame-heads for the spool bearings and gearing is made as usual, and forms no part of this invention.

Having thus fully described my invention, what I claim as new, and desire to secure by Letters Patent, is—

1. In a fishing-reel, the frame-heads of the reel, composed of solid hard-rubber heads or bodies $h$ and inner face metal brace-plates, $i$, embedded, previous to vulcanization of the rubber, in and made to form integral portions of the rubber heads or bodies, and, in common with the rubber, constructed to present circular recesses $l$ in the inner faces of the combined rubber and metal frame-heads, for the heads of the spool of the reel to rotate within, substantially as specified.

2. In a fishing-reel, the head A of the frame, composed of a solid hard-rubber head or body, $h$, and embedded inner face metal brace-plate, $i$, having a dovetail fit, $m$, in the rubber, and both constructed to present a circular recess, $l$, on the inner face of the combined rubber and metal frame-head, essentially as and for the purposes herein set forth.

JULIUS VOM HOFE.

Witnesses:
FRANK OBERNIER,
ALFR. WINKOPF,
ADOLPH HAERL.